US012697836B2

(12) United States Patent
Li et al.

(10) Patent No.:     US 12,697,836 B2
(45) Date of Patent:          Aug. 4, 2026

(54) DECORATIVE PANEL AND METHOD FOR MANUFACTURING A DECORATIVE PANEL

(71) Applicant: FLOORING INDUSTRIES LIMITED, SARL, Bertrange (LU)

(72) Inventors: Yu Hin Li, Jiangsu (CN); Jonas Deman, Sint-Amandsberg (BE); Benny Schacht, Vlamertinge (BE)

(73) Assignee: UNILIN BV, Wielsbeke (BE)

( * ) Notice: Subject to any disclaimer, the term of this patent is extended or adjusted under 35 U.S.C. 154(b) by 218 days.

(21) Appl. No.: 18/554,817

(22) PCT Filed: Apr. 13, 2022

(86) PCT No.: PCT/IB2022/053457
§ 371 (c)(1),
(2) Date: Oct. 11, 2023

(87) PCT Pub. No.: WO2022/224086
PCT Pub. Date: Oct. 27, 2022

(65) Prior Publication Data
US 2024/0190166 A1     Jun. 13, 2024

Related U.S. Application Data

(60) Provisional application No. 63/181,716, filed on Apr. 29, 2021.

(30) Foreign Application Priority Data

Apr. 21, 2021    (EP) ..................................... 21169637

(51) Int. Cl.
*B32B 3/10*          (2006.01)
*B29D 99/00*          (2010.01)
(Continued)

(52) U.S. Cl.
CPC ........ *B44C 5/0453* (2013.01); *B29D 99/0057* (2013.01); *B32B 3/06* (2013.01);
(Continued)

(58) Field of Classification Search
None
See application file for complete search history.

(56) References Cited

U.S. PATENT DOCUMENTS 3,784,664 A     1/1974 Nicklin
5,166,230 A    11/1992 Stecker
(Continued)

FOREIGN PATENT DOCUMENTS

CN          1338373 A     3/2002
CN      202954521 U     5/2013
(Continued)

OTHER PUBLICATIONS

Extended European Search Report from corresponding EP Application No. 21169637.2, Oct. 11, 2021.
(Continued)

*Primary Examiner* — Christopher M Polley
(74) *Attorney, Agent, or Firm* — Workman Nydegger

(57)          ABSTRACT

A decorative panel includes a substrate and a decorative surface. The substrate includes a copolymer of an unsaturated polyester.

13 Claims, 8 Drawing Sheets

(51) Int. Cl.

| | |
|---|---|
| *B32B 3/06* | (2006.01) |
| *B32B 3/30* | (2006.01) |
| *B32B 27/10* | (2006.01) |
| *B32B 27/20* | (2006.01) |
| *B32B 27/30* | (2006.01) |
| *B32B 27/36* | (2006.01) |
| *B44C 5/04* | (2006.01) |
| *E04F 15/02* | (2006.01) |
| *E04F 15/10* | (2006.01) |
| *B29K 25/00* | (2006.01) |
| *B29K 67/00* | (2006.01) |
| *B29K 105/00* | (2006.01) |
| *B29K 105/12* | (2006.01) |
| *B29K 105/16* | (2006.01) |

(52) U.S. Cl.

CPC ............... *B32B 3/30* (2013.01); *B32B 27/10* (2013.01); *B32B 27/20* (2013.01); *B32B 27/302* (2013.01); *B32B 27/36* (2013.01); *E04F 15/02038* (2013.01); *E04F 15/107* (2013.01); *B29K 2025/06* (2013.01); *B29K 2067/06* (2013.01); *B29K 2105/0002* (2013.01); *B29K 2105/12* (2013.01); *B29K 2105/16* (2013.01); *B32B 2260/028* (2013.01); *B32B 2260/046* (2013.01); *B32B 2270/00* (2013.01); *B32B 2419/04* (2013.01); *E04F 2201/0153* (2013.01); *E04F 2201/023* (2013.01); *E04F 2201/043* (2013.01)

(56)     References Cited

U.S. PATENT DOCUMENTS

| | | | |
|---|---|---|---|
| 5,932,314 | A | 8/1999 | West |
| 7,451,578 | B2 | 11/2008 | Hannig |
| 8,071,193 | B2 | 12/2011 | Windmoller |
| 9,650,483 | B2 | 5/2017 | Hannig |
| 10,619,358 | B2 | 4/2020 | Segaert |
| 2002/0086140 | A1* | 7/2002 | Ghahary ................. B32B 27/32 427/407.1 |
| 2007/0003791 | A1 | 1/2007 | Rochette |
| 2008/0138560 | A1 | 6/2008 | Windmoller |
| 2014/0150369 | A1 | 6/2014 | Hannig |
| 2015/0298426 | A1 | 10/2015 | Hannig |
| 2015/0368421 | A1 | 12/2015 | Hannig |
| 2019/0099915 | A1* | 4/2019 | Adams ................. B28B 11/001 |

FOREIGN PATENT DOCUMENTS

| | | | |
|---|---|---|---|
| CN | 108474213 | A | 8/2018 |
| EP | 1290290 | A1 | 3/2003 |
| EP | 1415056 | A1 | 5/2004 |
| EP | 1938963 | A1 | 7/2008 |
| EP | 2440724 | A1 | 4/2012 |
| EP | 2800847 | A2 | 11/2014 |
| WO | 9747834 | A1 | 12/1997 |
| WO | 2005021254 | A1 | 3/2005 |
| WO | 2006043893 | A1 | 4/2006 |
| WO | 2007073025 | A1 | 6/2007 |
| WO | 2009061279 | A1 | 5/2009 |
| WO | 2010070485 | A2 | 6/2010 |
| WO | 2010103417 | A1 | 9/2010 |
| WO | 2011141849 | A2 | 11/2011 |
| WO | 2014117887 | A1 | 8/2014 |
| WO | 2016001859 | A1 | 1/2016 |
| WO | 2017122149 | A1 | 7/2017 |
| WO | 2020020544 | A1 | 1/2020 |
| WO | 2020095196 | A1 | 5/2020 |

OTHER PUBLICATIONS

International Search Report from corresponding PCT Application No. PCT/IB2022/053457, Jun. 15, 2022.

\* cited by examiner

DECORATIVE PANEL AND METHOD FOR MANUFACTURING A DECORATIVE PANEL

BACKGROUND

This invention relates to decorative panels and a method for manufacturing decorative panels. The invention is in the first place aiming at floor panels, but may be put to practice with wall panels, ceiling panels or furniture panels as well.

More particularly, the invention relates to floor panels of the type which is at least composed of a substrate and a decorative surface, for example a top layer provided on this substrate, wherein said top layer comprises a motif. Above said motif a transparent or translucent synthetic material layer may be provided, which layer then forms part of said top layer.

In particular, the present invention relates to floor panels of the type which, at two or more opposite edges, comprises coupling means or coupling parts, with which two of such floor panels can be coupled at the respective edges, such that they are locked together in a horizontal direction perpendicular to the respective edge and in the plane of the floor panels, as well as in a vertical direction perpendicular to the plane of the floor panels. Such floor panels can be applied for composing a so-called floating floor covering, wherein the floor panels are interconnected at their edges, however, are lying freely on the underlying floor.

From WO 97/47834 and EP 1 290 290, laminate floor panels are known for forming a floating floor covering. However, laminate floor panels show the disadvantage that they mostly are provided with a moisture-sensitive substrate, namely MDF or HDF (Medium Density Fiberboard or High Density Fiberboard), and that the top layer provided on said substrate, when the floor covering is in use, leads to the development of ticking noises. Furthermore, the panels of WO'834 are subject to dimensional changes with a changing ambient relative humidity, necessitating the use of expansion profiles and the likes to cover required expansion gaps, which takes away from the aesthetic pleasure and introduces safety hazards. From EP 1 290 290, it is known to provide laminate floor panels with a structured surface, for example, with a structure imitating wood pores.

From EP 1 938 963, vinyl-based floor panels are known for forming such floating floor covering. Such vinyl-based floor panels mostly have a thickness of 3 to 5 millimeters and have a high material density. Inherent to these floor panels is their limited bending stiffness and their high deformability. These features lead to problems when the floor panels are applied on an uneven underlying surface. Namely, after a certain period of time the unevenness of the underlying surface may migrate to the surface of the floor covering. With a local load, for example, underneath the legs of tables or chairs, permanent impressions will occur, which are undesired as well. The floor panels of EP 1 938 963 require the presence of plasticizers in the soft PVC core, which may lead to environmental issues and safety hazards. Since, over time, the use of certain plasticizers and other additives in PVC has been forbidden, the recycling of old PVC materials is far from straightforward, since such PVC scrap may contain chemicals that in the meantime have been legally forbidden for use. The halogen content in the PVC is often in itself seen as a source of pollution, for example when such material would be burnt at the end of its lifecycle.

WO 2011/141,849 and WO 2014/117,887 disclose decorative panels having a foamed core. In accordance with WO 2011/141,849 a higher bending stiffness, and an enhanced resistance against migration of underlying surface unevennesses is obtained. In accordance with WO'887 the foamed core is plasticizer free, and may be based on a substituted or unsubstituted polyolefin thermoplastic material. WO 2017/122149 discloses decorative panels having a core comprising thermoplastic polyester and elastomer.

Decorative panels based on unsubstituted polyolefins, substituted polyolefins, such as polyvinyl chloride (PVC), or on thermoplastic polyesters such as polyethylene terephthalate comprise a substrate material that is better resistant against water, and leads to a better accepted noise development in use than the panels of WO'834. Such panels are however also subject to dimensional changes, however, mostly caused by a changing ambient temperature. In contrast to the ambient relative humidity, the ambient temperature may be significantly less uniformly distributed over a surface that is covered with panels. The dimensional changes may lead to localized expansion phenomena, for example where sunlight directly falls on the covering, i.e. at a so-called "hot spot". The covering may rise locally at the hot spot and form a bubble and/or the joints may locally deform upwardly and peak out of the covered surface.

Some solutions to the thermal expansion of thermoplastic panels are proposed in WO 2016/001859, such as the incorporation of glass fiber textiles and/or filler materials. Technically and economically speaking, the possibilities to stabilize thermoplastic materials are limited. An introduction of a high amount of filler materials in thermoplastic materials for example leads to brittleness, making it hard to realize trustworthy mechanical coupling means in such materials.

SUMMARY

The present invention relates to an alternative decorative panel, which in particular is intended as a floor panel for forming a floating floor covering. According to various preferred embodiments of the invention, also a solution is offered for one or more problems with the floor panels of the state of the art.

To this aim, the invention, according to its first independent aspect, is a decorative panel comprising a substrate and a decorative surface, with as a characteristic that said substrate comprises a copolymer of an unsaturated polyester. Preferably, said substrate is single layered, but, in accordance with variants, may comprise several layers. Preferably at least one of said layers comprises said copolymer, wherein the respective layer or substrate is at least for 10 wt % formed from said copolymer. Preferably said copolymer is uniformly spread over the respective layer or substrate. Preferably said copolymer forms the matrix or gluing phase of a synthetic composite material. Preferably the respective layer or substrate essentially consists of said synthetic composite material.

According to the most preferred embodiment, said substrate comprises or is a layer forming at least half of the thickness and/or half of the weight of the decorative panel.

Unsaturated polyesters are condensation polymers formed by the reaction of polyols, organic compounds with multiple alcohol or hydroxy functional groups, with unsaturated and in some cases saturated dibasic acids. Typical polyols used are glycols including ethylene glycol, propylene glycol, and diethylene glycol; typical acids used are phthalic acid, isophthalic acid, terephthalic acid, and maleic anhydride. Unsaturation may be in the form of maleate and fumarate species along the polymer chain. Unsaturated polyester resins are thermosetting. After curing, a water resistant material is obtained that has a low dimensional expansion upon changing ambient temperature, such that localized expansion phenomena due to for example hot spots are largely avoided.

The copolymer material in the decorative panel can be provided without the use of plasticizer or halogens. Moreover the copolymer material provides several ways of recuperation, be it at the end of the product life or as a scrap material generated in production. It can for example be chemically decomposed again to its original constituents, the cured material may also be used as filler material in plastics, or it can be burnt to recuperate energy with minimized impact on environment.

Due to the thermosetting nature of the copolymer in the decorative panel of the invention problems with unevenness in the underlaying surface are minimized.

Preferably, said copolymer is a copolymer of an unsaturated polyester and a vinyl monomer, or in other words, said unsaturated polyester is cured together with a vinyl monomer. The vinyl monomer acts as a crosslinking agent in the curing reaction and can be provided as a diluent for the unsaturated polyester. Preferably the vinyl monomer comprises or consists of styrene. According to variants, the vinyl monomer comprises alpha-methyl styrene, methyl methacrylate, vinyl toluene, vinyl acetate and/or ethylene glycol diacrylate.

Preferably, said copolymer is a copolymer of, or obtained from the curing reaction of, an unsaturated polyester and styrene. The inventor obtained the best mechanical properties and a fluent manufacturing in an economic way using styrene as the crosslinker in the curing of unsaturated polyester.

Preferably, said unsaturated polyester comprises, or is, a dicyclopentadiene resin. According to variants, said unsaturated polyester comprises or is a resin selected from the group consisting of a resin containing terephthalic acid, a resin containing phthalic anhydride, and a resin containing isophthalic acid.

Preferably, said substrate or copolymer further comprises 0.1 to 10 wt % of a metal salt, preferably a transition metal salt, and/or 0.1 to 10 wt % of an organic peroxide, preferably benzoyl peroxide or methyl ethyl ketone peroxide. Metal salt and/or organic peroxide may catalyze the curing or crosslinking reaction of the unsaturated polyester and the vinyl monomer. As a metal salt, cobalt salt may be used. The amount of catalyst, be it metal salt or organic peroxide, is preferably limited to a total of maximum 10 wt %, since the curing reaction is exothermic, damages or undesired mechanical properties may occur to the material due to excessive heating.

Preferably, as afore stated, said copolymer forms the matrix or gluing phase of a synthetic composite material. Preferably, in such case, said substrate or said synthetic composite material further comprises at least 2.5, at least 3, or at least 4, weight parts filler materials per weight part of the copolymer. As a filler material inorganic particles, such as particles of calcium carbonate, perlite, sand or the like may be used. The inventor has found that a substrate or layer comprising said copolymer can be highly filled without an unacceptable loss of resiliency of the respective obtained synthetic composite material. In accordance with a special embodiment, the filler material comprises particles of ground cured unsaturated polyester resin, preferably of the same composition as said matrix or gluing phase. For example, shredded or ground recovered decorative panels showing the characteristics of the invention, or waste obtained during the manufacturing of such panels, can be recycled and recuperated as a filler material in the substrate or the respective layer comprising the copolymer. As an alternative, organic fillers, such as cellulose based fillers may be used. In such case, wood, bamboo, flax, elephant grass, or rice husk, in particles or fibers, may be employed as filler materials.

Preferably, said substrate or the respective layer that comprises said copolymer or synthetic composite further comprises reinforcement fibers, such as at least 0.1 wt % of such reinforcement fibers. Preferably, said substrate or the respective layer that comprises said copolymer or synthetic composite further comprises at least 5 wt %, preferably 5 to 25 wt %, reinforcement fibers. With the availability of reinforcement fibers the resiliency and/or the dimensional stability of the obtained panel may be further optimized. This is in particular interesting in the case of panels having mechanical coupling parts with flexible or compressible portions. With the reinforcement fibers an acceptable degree of resiliency can be maintained even in the case of the presence of a high amount of fillers materials, for example when said substrate or said synthetic composite material comprise at least 3, or at least 4, weight parts filler materials, such as $CaCO_3$ particles per part of the copolymer. Preferably, the reinforcement fibers are, preferably loosely and separately, distributed over the thickness of the substrate or layer comprising the copolymer of the invention. In accordance with a variant said reinforcement fibers may, instead of being provided individually in the copolymer, be interconnected and form a woven or non-woven textile embedded in the copolymer material or the synthetic composite. Said reinforcement fibers may further show one or a combination of two or more of the following properties:

the property that said reinforcement fibers are chosen from the list consisting of glass fibers, rock fibers, polyvinyl alcohol fibers, steel fibers, aramid fibers, polyethylene fibers and carbon fibers. In the case of glass fibers preferably fibers of E-glass are used, as defined in DIN 1259; and/or the property that said reinforcement fibers have a tensile strength above 2500 MPa and/or a Young's modulus of more than 40, still better of more than 60 GPa; and/or the property that said reinforcement fibers have an average length of 1 mm or more; and/or the property that said reinforcement fibers have a diameter situated between 1 and 100 micrometers or still better between 3 and 30 micrometers.

Preferably said copolymer is at least obtained from an unsaturated polyester resin, a vinyl monomer, preferably styrene, calcium carbonate, chopped glass fibers, and organic peroxide.

Preferably said copolymer or synthetic composite forms a solid material layer or substrate, that is free from internal voids. According to a variant, said copolymer or synthetic composite may be foamed to yield a weight reduction of at least 5%. Preferably such foaming is obtained through the addition of foamed filler materials, such as expanded polystyrene, perlite, vermiculite, pumice or the like. According to still another variant, said copolymer or synthetic composite comprises internal voids in the form of hollow chambers surrounded at least in two orthogonal directions by said copolymer or synthetic composite material. Such chambers may for example be obtained in the course of the production of the respective substrate or layer, for example, a production by means of extrusion or moulding. Preferably such chambers are open towards one or both edges of a pair of opposite or adjacent edges of the respective substrate or layer. The availability of internal voids in the form of foam cells or larger chambers may provide for an economization on material use, as well as provide additional properties, such as noise attenuation, or provide additional technical functionality, such as the possibility to guide tubes or wires through said chambers. With voids or chambers open at one or both edges of at least one pair of opposite edges, additional flexibility may be delivered to the possibly available coupling means at the relevant edge and/or pockets may be provided for extraneous functional materials, such as water-repellent agents or superabsorbing polymer materials.

Preferably said decorative panel is rectangular, either square or oblong. When the ratio between the length of the long pair of opposite edges and the short pair of opposite edges is from 1 to 3, a decorative panel having a stone or ceramic material look may be obtained. When said ratio is higher, a decorative panel having a wooden parquet panel look may be obtained. When said ratio is 1, a decorative panel having a wooden parquet tile look may be obtained as well. According to variants, said decorative panel may have a triangular, quadrangular (e.g. trapezoid), hexagonal shape, for example such that patterns can be achieved in a covering assembled from such panels.

Preferably, said substrate comprises one or more excavations at least at a bottom surface thereof. Such excavations may serve to economize on the used material. Due to the thermosetting nature of the copolymer, any risk of such excavations becoming visible at the decorative surface of the panel is minimized. The inventor has found that such material is able to bridge a relatively large area without risk of deformation at the decorative surface. The excavations may be realized in accordance with several possibilities of which here below some possibilities are listed without being exhaustive.

According to a first possibility, said one or more excavations are formed as a pocket that is only open towards the bottom surface of the substrate. Such excavation may be made without intersecting the edges of the decorative panel, such that potential profiled edges, that for example may contain coupling means, can be fully exploited. According to a preferred embodiment of the present first possibility, said substrate comprises one excavation or a plurality of excavations separated from each other for example by ribs, wherein said one or a plurality of excavations together form an indented back surface extending over at least 40%, or at least 60% of the entire back surface of the substrate. Preferably said one excavation is centrally or about centrally located on said back surface. Preferably said plurality of excavations is a centrally or about centrally located formation of excavations. Preferably said formation is uniform with fixed distances between the respective excavations in one or both orthogonal directions in the plane of the back surface of the substrate. According to another preferred embodiment, said excavation is made in the form of a logo and/or forms a text.

According to a second possibility, said one or more excavations are formed as slits that are open towards the bottom surface of the substrate and towards at least one of the side edges of the panel. Preferably such slit is open towards at least two of the side edges of the panel. These two side edges may be opposite to each other, or adjacent to each other. According to a preferred embodiment of said second possibility, said one or more excavations are open towards two opposite edges of a rectangular substrate, while the other two opposite edges are uninterrupted.

Preferably the excavations are defined as extending, besides in depth direction, also in two orthogonal main directions, wherein the distance between the opposite side walls defining said excavation, in the orthogonal main direction wherein the excavation has the smallest extent, is preferably larger than the thickness of the panel, and even better amounts to at least 2 times the thickness of said panel. The inventor has noticed that the material of the substrate, when in accordance with the present invention, is able to bridge such excavations without or with a minimized risk of the top surface of the panel deforming and the excavations becoming visible at the decorative surface of the panel, even when the excavation extends in depth direction over 30% of the thickness of the substrate or more.

Preferably the excavations have a maximum depth of at least 20 percent of the thickness of the panel.

Preferably the excavations at their deepest point have a dome shaped geometry positioned on top of two opposite side walls defining said excavation, and/or a geometry at least defined by roundings extending into opposite side walls defining said excavation in one of said orthogonal directions.

The decorative surface of the decorative panel of the invention may be formed in accordance with several possibilities of which here below some are listed without being exhaustive.

In accordance with a first possibility, said decorative surface comprises a carrier sheet having a printed motif, wherein said carrier sheet is selected from a paper sheet, a PVC film, a PP film, a PE film, a PET film, a PETG film. In the case where the carrier sheet is a paper sheet, it is preferably provided with a resin such as a melamine-formaldehyde resin and/or an unsaturated polyester resin. The inventor has found that the use of a mixture of melamine-formaldehyde and unsaturated polyester resin may lead to a very good scratch and abrasion resistance, together with an enhanced delamination resistance. In accordance with the present first possibility, the decorative surface may further comprise a transparent layer applied over said printed motif. Preferably such transparent layer comprises the same or similar polymeric material as the carrier sheet or resin applied thereto.

In accordance with a second possibility, said decorative surface comprises a printed motif formed on the substrate, preferably with the intermediate of primer and/or background layers. Preferably such printed motif is formed on the substrate by means of an inkjet printer, for example working with water based inks. Prior to the printing one or more primer layers, preferably waterbased primer layers, are applied to the surface of the substrate. In accordance with the present second possibility, the decorative surface may further comprise a transparent layer applied over said printed motif. Preferably such transparent layer comprises a radiation curable lacquer, such as an UV curable acrylic lacquer.

In accordance with a third possibility, the surface of said substrate remains at least partially visible at said decorative surface. Preferably, in such case, the substrate at least at the respective surface is colored or comprises colored regions making up a motif. The coloration of the substrate material may extend towards the center of the substrate, for example over a distance of at least 0.5 mm, or may extend further down, potentially over the entire thickness of the substrate. A transparent lacquer or other layer may be applied on top of the substrate material. Potentially the present third possibility may be combined with the above second possibility in that the motif formed by the substrate is locally complemented by means of a printed motif, for example to include intricate features. Preferably, however, in accordance with the present third possibility, preferably at least 30% of the area of the surface of the substrate material, and even better at least 75%, remains visible at the decorative surface.

With the above first possibility, as well as with the above second and/or third possibility, a relief or structure may be realized at the decorative surface. Such relief or structure may be obtained by forming the substrate and conforming the decorative surface thereto and/or by forming the decorative surface. Such relief or structure may be realized in accordance with the motif or vice-versa, wherein for example wood pores, grain lines, knots and/or cracks available in a e.g. printed wood pattern may be accompanied with a matching excavation in the transparent layer immediately above the respective motif portion and/or wherein for example excavations in the form of wood pores, grain lines, knots and/or cracks formed in the top surface of the substrate material may be provided with a matching printed motif portion. The printed motif may follow the unevenness of the substrate and the transparent layer applied over the printed motif will be made to generally conforming to the relief of the printed motif, although it may be provided with local impressions independently from the substrate surface. In case the surface of the substrate as well as the transparent layer is deformed independently from each other, then preferably the depth and/or area of the maximum deformation available in the substrate surface is larger than the depth, respectively area of the maximum independent deformation available in the surface of the transparent layer. For example, deformations of the substrate may be used to imitate larger surface unevenness such as ripped out wood parts or wood cracks, or lower lying areas of stones, while the more restricted deformations that are independently available in the transparent layer may be used to imitate more subtle structure, such as general stone structure, wood grain and wood pores.

The decorative panel of the invention may be a floor panel, wall panel or ceiling panel, and may take any shape, however is preferably square or rectangular and oblong. The decorative panel may be provided with integrated installation means, such as an integrated pad at the surface of the panel opposite said decorative surface, integrated glueing means such as a pre-applied, potentially activatable, glue, and/or mechanical coupling means or coupling parts. In the case of a pre-applied glue, such glue may be applied at one or more edges and/or at the surface of the panel opposite said decorative surface. The pre-applied glue may be shielded from dust and other influences prior to installation with a releasable foil.

Preferably, said decorative panel is at least at two opposite edges provided with mechanical coupling means or coupling parts, with which two of such floor panels can be coupled at the respective edges. Preferably the panel is provided at the edges of both pairs of opposite edges with coupling means or coupling parts, either of the same type or of a different type. Preferably, said coupling parts allow that two such panels may become locked together in a horizontal direction perpendicular to the respective edge and in the plane of the panels, as well as in a direction perpendicular to the plane of the panels. It is clear that, when applied to floor panels, such floor panels are suitable for composing a so-called floating floor covering, wherein the floor panels are interconnected at their edges, however, are lying freely on the underlying floor.

Said mechanical coupling means or coupling parts may show one or a combination of two or more of the following features:

the feature that the coupling means provided at said two opposite edges are basically shaped as a tongue at one edge and a groove at an opposite edge. The groove is delimited by an upper lip and a lower lip. The tongue and groove may be essentially responsible for said locking in said vertical direction. The tongue and groove further comprise locking means preventing the drifting apart of the tongue and the groove, when in coupled condition. The locking means may comprise a protrusion on the upper side of the lower lip for cooperation with an excavation at the bottom of the tongue;

the feature that the coupling means allow the panels to become connected to each other at the respective edges by means of a turning motion of one panel relative to the other, and/or by means of a shifting motion in a substantially horizontal fashion of one panel towards the other;

the feature that the coupling means provided at said two opposite edges are basically shaped as a tongue at one edge and a groove at an opposite edge. The groove is delimited by an upper lip and a lower lip. The lower groove lip flexes and returns towards its original position upon coupling. In a coupled condition the lower groove lip may not have been returned completely to its original position, but, on the contrary may remain bent out, for example over a small distance, i.e. several hundredths of a millimeter. In so doing, the lower lip may at the location of a contact between the tongue and the groove actively push upon the tongue and force the tongue in a more tight engagement with said groove, wherein for example the width of a possible seam at the joint between the panels could be limited. Such action of the lower lip is known per se as "pretension" and is disclosed e.g. in WO '97/47834;

the feature that the mechanical coupling means or coupling parts allow a coupling by means of a downward-directed movement of a male coupling part having, for example, a tongue, into a female coupling part having, for example, a groove. Such mechanical coupling parts may be formed in one piece with the panel. In such case the mechanical coupling parts may require a flexible or compressible portion profiled from the material of the substrate. Such portion may flex away or become compressed upon introducing the male part into the female part and may relax towards the end of the coupling motion and at least add to, if not be responsible for, the obtained locking in the direction perpendicular to the plane of coupled panels. Such portion may be comprised on said female part, for example as a portion of a lip extruding sidewardly from a bottom portion of the panel and/or be comprised on said male part, for example as a protruding portion at the distal end of such male part. Applicable mechanical coupling parts are for example disclosed in PCT/IB2020/060310 (which was not public at the filing date of the present application), EP 2 440 724, or WO 2009/061279. In accordance with a variant such mechanical coupling parts may comprise a separate movable insert for example locking the respective edges in a direction perpendicular to the plane of coupled panels. In the latter case the separate movable inserts disclosed in EP 1 415 056, WO 2006/043893 or EP 2 800 847 may be applied;

the feature that the mechanical coupling means or coupling parts, or at least the pertaining upper edge, are realized by means of a milling treatment with rotating milling tools;

the feature that the contour of the mechanical coupling means or coupling parts is at least for 70% formed in the substrate, preferably in one or more layers of said substrate that comprise said copolymer or synthetic composite;

the feature that the contour of the mechanical coupling means or coupling parts is at least for 70% formed in one or more layers of said substrate that comprise said copolymer, reinforcement fibers and/or filler materials.

Preferably, said mechanical coupling means or coupling parts substantially or wholly are realized in said substrate. Preferably, said coupling means are provided by means of a milling treatment with rotating milling tools. Preferably, the floor panel of the invention relates to a rectangular, either oblong or square, panel, which is provided with mechanical coupling means on both pairs of opposite edges. Both pairs of edges may comprise coupling parts allowing the panels to become connected to each other at the respective edges by means of a turning motion of one panel relative to the other, and/or by means of a shifting motion in a substantially horizontal fashion of one panel towards the other. According to an alternative, one pair of edges may comprise coupling parts allowing the panels to become connected to each other at the respective edges by means of a turning motion of one panel relative to the other, and/or by means of a shifting motion in a substantially horizontal fashion of one panel towards the other, while the other pair of edges comprises coupling parts allowing coupling by means of a downward-directed movement of a male coupling part having, for example, a tongue, into a female coupling part having, for example, a groove.

The inventors have found that the substrate material of the present invention is ideally suitable for the provision of mechanical coupling means that require some flexibility of the substrate material upon coupling, for example as may be the case with mechanical coupling means allowing two panels to be connected by means of a turning movement, a sliding movement or a downward movement, in particular when these coupling parts are made in one piece with the panel. This is even the case when a high amount of filling materials is applied, for example when said substrate or said synthetic composite material further comprises at least 3, or at least 4, weight parts filler materials per part of the copolymer, and in particular when also reinforcement fibers are applied. Preferably, one or more of the flexible or compressible portions of such coupling parts comprise said copolymer or the synthetic composite material. In accordance with a preferred embodiment, said separate and loosely provided reinforcement fibers are present in one or more of the flexible or compressible portions of such coupling parts. Thus, in the case of coupling parts being substantially shaped as a tongue and groove with locking means, wherein these coupling parts allow two panels to be connected by means of a turning movement and/or by means of a sliding movement, preferably at least the lower lip of the groove comprises said reinforcement fibers. Preferably the entire upper side of such lower lip is formed of said substrate or layer that comprises said copolymer or synthetic composite. At its thinnest portion, the lower lip of the groove is preferably for at least 50%, and even better at least 80%, of its thickness formed from said substrate or layer that comprises said copolymer, and thus preferably also said reinforcement fibers. In the case of coupling parts being shaped as a male part and a female part, wherein these coupling parts allow two panels to be connected by means of a downward movement, whether or not being performed in one piece with the panel, preferably said female part comprise a lip extending from a bottom portion of said panel, comprising a seat for receiving said male portion. Said lip preferably comprises said reinforcement fibers, wherein preferably the entire upper side of said lip is formed of said substrate or layer that comprises said copolymer or synthetic composite. At its thinnest portion, said lip of said female part is preferably for at least 50%, and even better at least 80%, of its thickness formed from said substrate or layer that comprises said copolymer, and thus preferably also said reinforcement fibers.

With a similar goal as in the first aspect, the present invention, in accordance with a second independent aspect, is a method for manufacturing a decorative panel, wherein said decorative panel comprises a substrate and a decorative surface, with as a characteristic that said method comprises at least the step of providing a substrate comprising a copolymer of an unsaturated polyester. It is clear that the method of the second aspect may be used to manufacture the panels of the first aspect and/or the preferred embodiments thereof.

Preferably, said step of providing a substrate comprises providing a mixture by mixing a resin selected from the group consisting of a dicyclopentadiene resin, a resin containing primarily terephthalic acid, a resin containing primarily phthalic anhydride, and a resin containing primarily isophthalic acid with at least a vinyl monomer, preferably styrene; and shaping and curing said mixture into at least a part of said substrate.

Preferably said step of mixing comprises kneading and/or extruding the components of said mixture.

Preferably, said mixture further comprises filler materials, reinforcement fibers, metal salt and/or organic peroxide.

Preferably, said shaping at least includes a compaction of said mixture, for example into the finally desired thickness. Said shaping may further include a sizing into a rectangular or square shape having the size of once about the eventual size of the panel, or of an integer number of about the eventual size of the panel and/or may include the formation of a relief at one or more of the major surfaces of the substrate material and/or may include the formation of profiled edges at one or more of the sides of the substrate material. Such profiled edges may for example comprise coupling parts or portions thereof, as described above.

Preferably, said shaping and curing said mixture comprises pressing said mixture at a pressure of 0.1 MPa to 6 MPa, preferably of 1 MPa or above. Preferably said shaping and curing is executed by means of an opening and closing press. Such opening and closing press may contain one or more structured press elements for providing a relief in one or both of the major surfaces of the substrate material. According to a variant, said shaping and curing comprises extruding said mixture through a die, for example a flat die. Said extrusion may be followed by a structuring operation providing a relief in one or both of the major surfaces, for example by means of one or more rollers, or by means of a continuously operated press. According to still another variant, said shaping and curing said mixture comprises depositing, for example by means of one or more scattering stations, said mixture on a conveying means and compressing said mixture by means of a continuously operated press, for example between the belts of a steel belt press. One or both steel belts may be structured, or an additional structured material may be introduced in the press in order to shape a relief into one or both of the major surfaces of the substrate material. The additional structured material may be a press foil or a press plate.

In general, preferably, said shaping and/or curing is performed in a closed mould cavity, i.e. a cavity that surrounds the mixture to be shaped and/or cured in all directions, when in operation. Such mould cavity may for example be comprised in an opening and closing press as described here above, or in an injection moulding equipment.

According to an alternative embodiment, said shaping may include an additive manufacturing technique, such as material jetting, wherein at least the mixture is deposited in a non-uniform or spatially varying manner.

Preferably, said mixture comprises at least the following components in the following amounts:

100 parts by weight of a mix, wherein said mix comprises 30-60% of unsatured polyester, preferably dicyclopentadiene resin (e.g. CAS #77-73-6), 25-55% of a vinyl monomer, preferably styrene (e.g. CAS #100-42-5) and, potentially 5 to 20% of polystyrene (e.g. CAS #9003-53-6);

0 to 600 parts by weight, preferably 200 to 500 parts by weight of a filler material, preferably calcium carbonate;

0 to 50 parts by weight, preferably 10 to 35 parts by weight of reinforcement fibers, preferably chopped fiberglass;

0.1 to 5 parts by weight, preferably 0.5-2.5 parts by weight of an organic peroxide, preferably tert-Butyl peroxybenzoate (e.g. CAS #614-45-9) or tert-Butyl perbenzoate; and preferably 0 to 8 parts by weight, preferably 2 to 6 parts by weight of a metal salt, such as zinc stearate (e.g. CAS #557-05-1).

According to the most preferred embodiment, said mixture comprises at least the following components in the following amount:

100 parts by weight of a mix, wherein said mix comprises 44-48% of unsatured polyester, 42-46% of styrene (e.g. CAS #100-42-5) and 9 to 11% of polystyrene (e.g. CAS #9003-53-6);

400 parts by weight of calcium carbonate;

30 parts by weight of chopped fiberglass;

1 part by weight of TBPB or tert-Butyl peroxybenzoate (e.g. CAS #614-45-9); and 4.5 parts of zinc stearate (e.g. CAS #557-05-1).

The zinc stearate or metal salt may function as a release agent during shaping of the mixture.

Preferably, said shaping and curing comprises forming said part of said substrate to have a board shape with a decorative relief in at least one of the major surfaces of said board. As explained in connection with the first aspect, deformations of the substrate may be used to imitate larger surface unevenness such as ripped out wood parts or wood cracks, or lower lying areas of stones.

Preferably, said method further comprises the step of providing a decorative surface to said substrate. As explained in connection with the first aspect, several possibilities may be practiced for this, for example the first or second possibility mentioned above. Preferably, said step of providing a decorative surface comprises applying a paper sheet to said substrate, wherein said paper sheet is provided with melamine formaldehyde resin and/or unsaturated polyester resin. In the case of said decorative surface comprising a printed motif formed on the substrate, e.g. with the intermediate of primer and/or background layers, such printed motif is preferably applied in register with any relief formed in the respective major surface of the substrate. To this aim, the printing equipment is provided with data concerning the substrate to be printed, such that the print to be applied can be lined up with the formed relief. For example, the relief of the surface may be recognized by means of optical inspection, e.g. through one or more camera's, or by means of markings available on the object to be printed. Preferably the printing equipment comprises a digitally controlled printer, such as an inkjet printer.

In accordance with any of the above aspects, the substrate of the panel preferably has a maximum thickness of 2 to 10 millimeter. The panel preferably has a maximum thickness of 2 to 15 millimeter.

Preferably, said substrate material has an average density of at least 450 kilograms per cubic meter. Preferably said average density is between 500 and 900 kilograms per cubic meter. According to another preferred embodiment, said average density is between 1500 and 2400 kilograms per cubic meter, more particularly between 1850 and 2150 kilograms per cubic meter. Such preferred embodiment is especially obtained when said filler materials are applied at a rate of at least 3, or at least 4 weight parts per weight part of the copolymer.

According to a special embodiment of the first and/or second aspect of the invention, said copolymer or synthetic composite is foamed, preferably to an extent leading to a weight reduction of at least 10% in the layer containing said copolymer or synthetic composite, or at least 7% in the substrate material as a whole.

In general, in the context of the present invention, the substrate of a panel is a material free from glue layers extending underneath the top of the panel, potentially underneath a top layer, and forming preferably at least half of the thickness of the respective panel and/or half of the weight of the respective panel. As stated earlier, the substrate may be formed of a single layer of uniform or practically uniform composition, or may be formed of a plurality of layers, each having its own uniform or practically uniform composition. In the latter case the respective layers are adhered to each other without the intermediate of glue layers, but are instead for example thermally laminated to each other, or cured or solidified on top of each other. One or more of such layers may comprise reinforcement sheets such as glass fiber layers, for example in the form of a woven or non-woven glass fiber layer. Preferably the layers are free from textile layers. As stated earlier, preferably the substrate comprises reinforcement fibers that are separately and loosely distributed, preferably uniformly or practically uniformly distributed, in a single layer or in a plurality of layers.

As already mentioned, the substrate material of the invention, in accordance with any of the preceding aspects, may be single layered or may be formed to comprise a plurality of layers, for example three or five layers, wherein at least one of said layers is realized on the basis of said unsaturated polyester resin. A multilayered substrate may show one or a combination of two or more of the following properties:

at least two layers, and preferably all layers, comprise said copolymer and/or are formed from said synthetic composite. It is clear that the copolymer and/or synthetic composite may show the preferred compositions and other properties mentioned above;

at least one layer comprises a thermosetting resin different from said copolymer. Preferably such layer is free from said copolymer. Said thermosetting resin may be chosen from the list consisting of thermosetting polyurethane, melamine formaldehyde, ureum formaldehyde, phenol formaldehyde, thermosetting acrylic resin and mixtures thereof. Such layer may comprise a sheet material, such as a paper sheet, a cardboard sheet or a textile layer, woven or non-woven. In the case of thermosetting acrylic resin, the resins disclosed in WO 2020/095196 may be applied;

at least one layer comprises a thermoplastic polymer. Preferably such layer is free from said copolymer. Said thermoplastic polymer may be a polyolefin such as polyethylene or polypropylene, a polyester, such as polyethylene terephthalate, or a vinyl polymer, such as polyvinyl chloride or polyvinyl butyrate. Preferably such layer further comprises filler materials, preferably inorganic filling materials, such as CaCO3;

at least one layer is wood-based or comprises wood. The respective layer may comprise wood fibers and/or wood particles for example in an amount of at least 10% by weight. The fibers and/or wood particles may be adhered to each other by means of a thermoplastic or thermosetting material, different from said copolymer or not. The respective layer may for example be or have the composition of a wood fiberboard, such as MDF, or of a wood chipboard. According to a variant the respective layer may be essentially formed of a layer of natural wood. Such layer of natural wood may be perforated for example due to the natural presence of holes formed by absent wood nuts or due to machining. Such perforations may allow the material of adjacent layers to extend into and potentially through said layer of natural wood, leading to a good incorporation of such layer in the substrate material;

at least one layer is provided with a color different from the color of another layer within the multilayered substrate. Preferably such layer is colored using coloring pigments or dyes;

at least one layer comprises an integrated motif. Herewith it is meant that the layer comprises regions of different color forming a motif. For example a layer may be colored to represent a wood grain motif or a stone vain motif through the thickness of the respective layer.

The presence of differently colored regions in at least one layer of the substrate material in order to form an integrated motif is also of interest in the case of single layered substrates. In the case of both single layered and multi layered substrates, such integrated motif is preferably present at least at the top surface of the substrate, and preferably extends at least 0.5 mm into the thickness of said substrate. Hence, it may form the decoration of the respective panel, and/or add to the realistic impression of a decorative top layer provided on said surface. In the latter case, the integrated motif preferably has a color matching said decorative top layer. When observed from the side of the panel, the integrated motif may show the image of wood grain lines or stone vains matching respectively a wood design or a marble or granite design. In any case, an enhanced wear resistance may be obtained since a larger depth of abrasion, for example within the integrated motif, may remain acceptable to the user. In accordance with a special embodiment, the panel of the invention comprises a substrate having an integrated motif, i.e. a substrate comprising differently colored regions, throughout its thickness or essentially throughout its thickness. The differently colored regions form a motif on the surface of the substrate. In any horizontal cross-section through the thickness of the substrate a same or different motif may be present. Preferably, the motif is continuously changing from one horizontal cross-section to another, i.e. without abrupt changes, throughout the thickness of the substrate material or throughout essentially thickness of the substrate material. The continuous change preferably results in colored regions that are continuous through the thickness of the substrate, and are preferably gently sweeping sideways throughout said thickness. Said sideways sweep may comprise a horizontal position change of a colored region boundary that is smaller than two times the thickness over which the change manifest itself. The top surface of such panel may be finished at least with a transparent layer, such as a lacquer layer or a melamine layer, in a manner that the top surface of the substrate and the motif formed by said colored regions remains visible. It is not excluded that certain color enhancements or decor features are additionally printed over the surface of said substrate. Preferably, however, at least 30% of the area of the surface of the substrate, and even better at least 75%, remains visible in the final panel.

A decorative panel with a motif integrated in the substrate, for example in accordance with the above, may be manufactured using a so-called digital dry decoration method, wherein powders of differently colored substrate material, are deposited in a controlled manner. For example one or more scattering units may be applied extending transversally over at least a portion of a conveyor means, wherein the scattering units comprise a plurality of individually controllable openings through which the powder can exit the scattering unit. The respective openings may be controllable to open and close in accordance with a motif to be formed in the respective portion of the thickness of the substrate, preferably at least at the surface of said substrate.

In accordance with a special embodiment of the invention in accordance with its first and/or second aspect, the substrate of said panel may contain an internal material that is in at least two orthogonal directions adjacent to said copolymer or synthetic composite. The internal material may for example have a rectangular prism shape that is at both edges of a pair of two opposite small edges adjacent to said copolymer or synthetic composite. Additionally such internal material may be adjacent to said copolymer at both edges of the other pair of two opposite small edges, at its bottom and/or at its top surface. The present special embodiment provides several additional possibilities for the panel of the invention, of which three possibilities are described in more detail here below without being exhaustive.

According to a first possibility, the internal material may be used to limit the amount of copolymer to be moulded, potentially leading to an accelerated manufacturing process. In such case, the internal material may be pre-shaped and placed in the mould. The copolymer may then be cured and shaped to be adjacent to the internal material in two or more orthogonal directions. The copolymer may be cured and shaped to completely surround said internal material.

According to a second possibility, the internal material may be a board material available at the surface of said substrate. For example the internal material may be a wood-based board, such as an MDF or HDF board (medium density or high density fiberboard). The availability of such board at the surface, wherein such board forms a major part of the actual surface of the substrate, for example at least 80%, may lead to advantageous finishing possibilities, such as easy lamination by means of melamine resin impregnated papers. Such internal material may in all other orthogonal directions be adjacent to said copolymer. The present possibility may also lead to an improved indentation resistance.

According to a third possibility, the internal material may provide additional functionality to said substrate or panel. For example the internal material may be made of a softer material than said copolymer, in order to provide some sound absorption.

From the above, it is clear that a panel in accordance with the first independent aspect and/or manufactured according to the second independent aspect having the following features in combination forms a particularly preferred embodiment of the present invention:

decorative panel comprising a substrate and a decorative surface, characterized in that said substrate comprises a copolymer of unsaturated polyester and a vinyl monomer, such as styrene; and wherein the substrate further comprises at least 3 weight parts, preferably at least 4 weight parts, filler materials, e.g. CaCO3 particles, per part of the copolymer; and wherein the substrate further comprises reinforcement fibers, e.g. chopped glass fibers, loosely and separately, distributed over the thickness of the substrate;

wherein the panel at at least two opposite edges is provided with mechanical coupling parts, either basically shaped as a tongue and a groove with an upper and lower groove lip, or shaped as a male and a female part, wherein said female part comprises a lip protruding from a bottom portion of the panel, wherein said lower groove lip or said lip of the female part, as the case may be, comprises said reinforcement fibers, said filler materials and said copolymer;

wherein said lower groove lip or said lip of the female part, as the case may be, is at its thinnest portion is at least for 50% of its thickness realized from a material comprising said copolymer, said filler material and said reinforcement fibers.

As explained above, the synergistic combination of these features may surprisingly lead to a serviceable easy to install, stable covering, e.g. a floor covering, assembled from a plurality of such panels by means of at least said mechanical coupling means. Of course such decorative panel may further show the preferred characteristics already described in connection to the first and/or second aspect of the invention.

BRIEF DESCRIPTION OF THE DRAWINGS

With the intention of better showing the characteristics according to the invention, in the following, as an example without limitative character, some embodiments are described, with reference to the accompanying drawings, wherein.

DETAILED DESCRIPTION OF VARIOUS EMBODIMENTS

Figures 1, 2, 3:
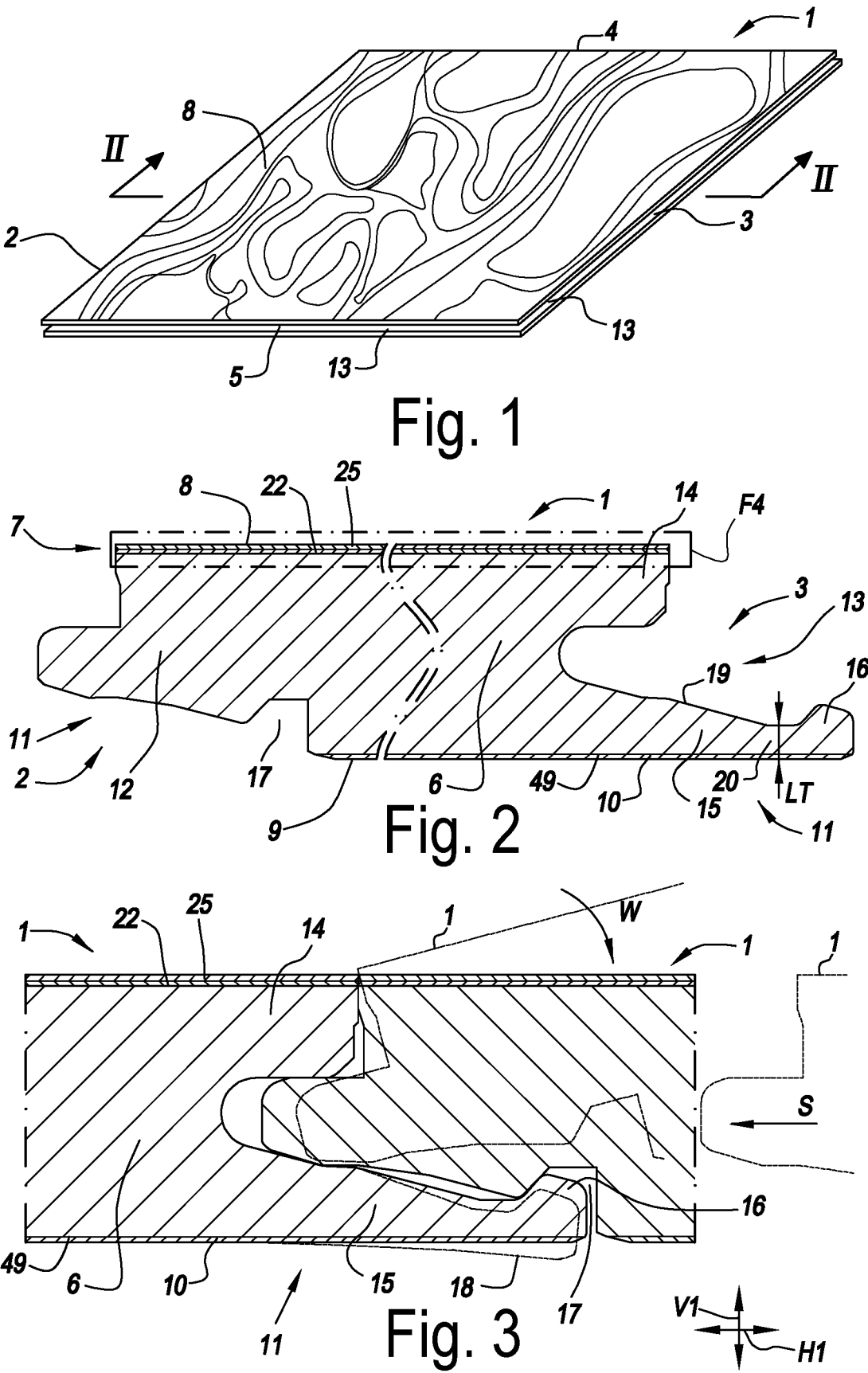
FIG. 1 in a perspective view shows a decorative panel in accordance with the invention.
FIG. 2 at a larger scale shows a cross-section in accordance with the line II-II of FIG. 1.
FIG. 3 in a similar view shows the connection between two such panels.

FIG. 1 shows a decorative panel 1 in accordance with the invention. In the example, the decorative panel 1 has a square or near square shape with two pairs of opposite edges 2-3-4-5. In accordance with a variant, the decorative panel 1 may be rectangular and oblong with a pair of opposite long edges and a pair of opposite short edges.

FIG. 2 clearly shows that the panel 1 comprises a substrate 6 and, in this case, a top layer 7 forming a decorative surface 8. At the bottom 9 of the panel 1 a backing layer 10 is provided as well.

The panel 1 is at least at two opposite edges 2-3 provided with coupling means or coupling parts 11, with which two of such floor panels 1 can be coupled at the respective edges 2-3. In the non-represented example of a rectangular and oblong panel these may for example be at least the long pair of opposite edges. Preferably the panel 1 is provided at the edges of both pairs of opposite edges 2-3-4-5 with coupling parts 11, either of the same type of different type.

As shown in FIG. 3, two such panels 1 may become locked together in a horizontal direction H1 perpendicular to the respective edges 2-3 and in the plane of the floor panels 1, as well as in a vertical direction V1 perpendicular to the plane of the floor panels 1. It is clear that such floor panels 1 can be applied for composing a so-called floating floor covering, wherein the floor panels 1 are interconnected at their edges, however, are lying freely on the underlying floor.

In the represented example, the coupling parts 11 provided at said two opposite edges 2-3 are basically shaped as a tongue 12 at one edge 2 and a groove 13 at an opposite edge 3. The groove is delimited by an upper lip 14 and a lower lip 15. The tongue 12 and groove 13 are essentially responsible for said locking in said vertical direction V1. The tongue 12 and groove 13 further comprise locking means preventing the drifting apart of the tongue 12 and the groove 13, when in coupled condition. The locking means comprise a protrusion 16 on the upper side of the lower lip for cooperation with an excavation 17 at the bottom of the tongue 12. The represented coupling means 11 allow the panels 1 to become connected to each other at the respective edges 2-3 by means of a turning motion W of one panel 1 relative to the other, as well as by means of a shifting motion S in a substantially horizontal fashion of one panel 1 towards the other.

The particularity of the panel 1 in accordance with the present invention is that the substrate 6, in this case a single layered substrate, comprises a copolymer of an unsaturated polyester. In the example, the substrate is single-layered and formed of a synthetic composite material comprising said copolymer, filler materials and reinforcement fibers.

FIG. 3 shows that the material of the substrate 6 allows for a flexibility of one or more portions of the coupling parts 11, in this case at least the lower groove lip 15, as shown by means of the dashed line 18. The lower groove lip 15 flexes and returns towards its original position upon performing said turning movement W or shifting movement S. In a coupled condition the lower groove lip 15 may not have been returned completely to its original position, but, on the contrary may remain bent out, for example over a small distance, i.e. several hundredths of a millimeter. In so doing, the lower lip 15 may at the location of the contact between said locking means, i.e. between the protrusion 16 and the excavation 17, actively push upon the lower side of the tongue 12 and force the tongue 12 in a more tight engagement with said groove 13, wherein for example the width of a possible seam at the joint between the flooring panels 1 could be limited. Such action of the lower lip 15 is known per se as "pretension" and is disclosed e.g. in WO '97/47834.

In the represented example, at least the lower lip 15 of the groove 13 comprises said reinforcement fibers. The entire upper side 19 of such lower lip 15 is formed of said substrate 6 that comprises said copolymer or synthetic composite. At its thinnest portion 20, the lower lip 15 of the groove 13 is for at least 50%, and here even for at least 80%, of its thickness LT formed from said substrate 6 that comprises said copolymer, filler materials and said reinforcement fibers.

Figures 4, 7:
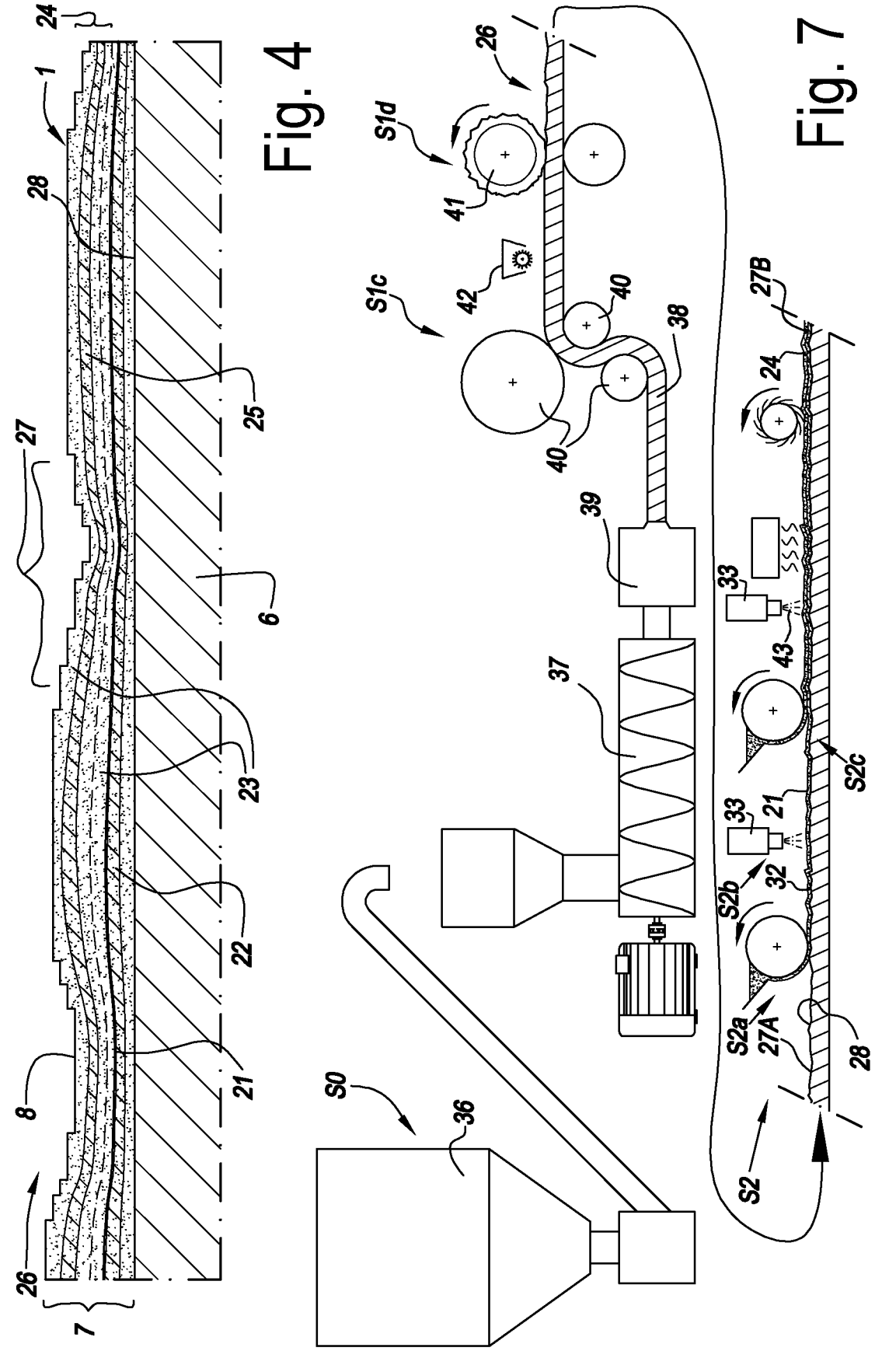
FIG. 4 at a larger scale gives a view on the are indicated with F4 in FIG. 2.
FIGS. 7 and 8 schematically show some steps in alternative methods for manufacturing a panel in accordance with the invention.

FIG. 4 shows that the decorative surface 8 of the decorative panel 1 comprises a decorative surface 8 in accordance with the first possibility therefor mentioned in the introduction. The decorative surface 8 comprises a carrier sheet having a printed motif 21, wherein said carrier sheet is a paper sheet 22 provided with a resin 23 such as a melamine-formaldehyde resin and/or an unsaturated polyester resin. The decorative surface 8 further comprises a transparent layer 24 applied over said printed motif 21. The transparent layer 24 comprises a paper sheet 25 as well and the same resin material as the printed paper sheet 22.

FIG. 4 further clearly shows that a relief 26 has been formed in the decorative surface 8. The relief 26 or structure may be realized in accordance with the printed motif 21, wherein a printed pattern, in this case representing a slate, is accompanied with matching excavations 27 in the transparent layer 24. In the example, the transparent layer 24 is deformed independently from the surface 28 of the substrate 6 that remains essentially flat. Not represented here is that the top layer 7 may comprise hard particles, e.g. particles of aluminumoxide at a position above said printed motif 21, for example at least in the layer of resin 23 between the transparent paper sheet 25 and the printed paper sheet 21, and/or in the resin 23 above the transparent paper sheet 25.

In the context of the present invention, hard particles, e.g. particles of aluminumoxide, may be used in any embodiment at least at a position above or within the motif.

Figure 5:
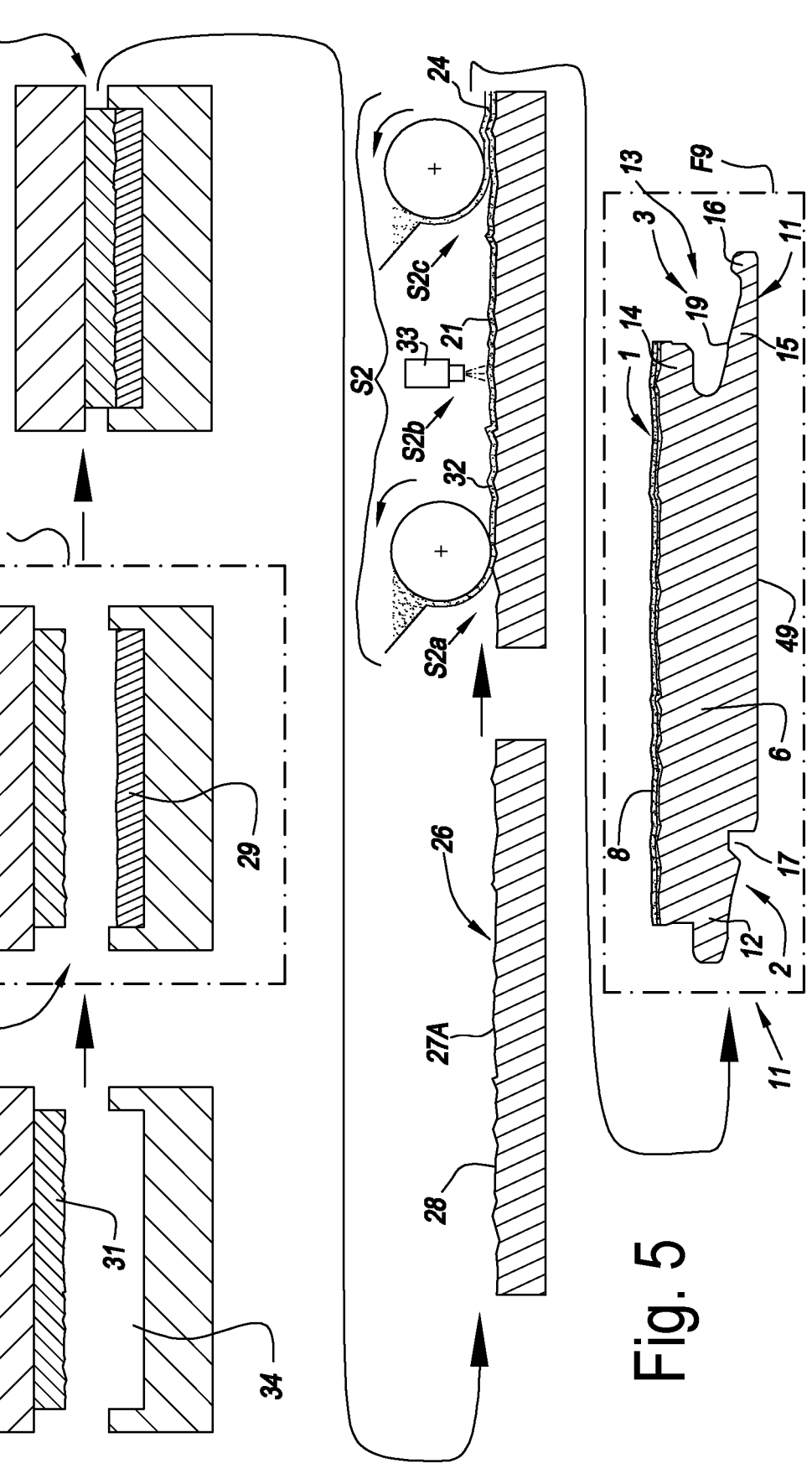
FIG. 5 schematically shows some steps in a method for manufacturing a panel in accordance with the invention.

FIG. 5 illustrates some steps in a method for manufacturing a panel 1 in accordance with the invention. The method comprises at least the step of providing a substrate comprising a copolymer of an unsaturated polyester. In the present case, said substrate is provided by mixing a dicyclopentadiene resin with styrene in a not-represented step S0, and by shaping and curing said mixture 29 into at least a part of said substrate in step S1. Preferably said mixture 29 further comprises filler materials, reinforcement fibers, metal salt and organic peroxide. Said shaping and curing is executed by introducing the obtained mixture in a press 30 during step S1a and pressing said mixture 29 at a pressure of 1 MPa or above in step S1b. In the represented example, said press 29 comprises a structured press element 31 which forms at least part of said substrate 6 to have a board shape with a decorative relief 26 in at least one of the major surfaces 28 of said board.

FIG. 5 illustrates that the method further comprises the step S2 of providing a decorative surface 8 to said substrate 6. In the example a decorative surface 8 in accordance with the second possibility therefor is obtained. Firstly in the step S2a, one or more, preferably water-based, primer or background layers 32 are applied to said substrate 6, whereupon in step S2b a printed motif 21 is formed on the primed surface, as illustrated here by means of an inkjet printer 33, for example working with water based inks. In step S2c a transparent layer 24 is applied over said printed motif 21. Preferably such transparent layer 24 comprises at least a radiation curable lacquer, such as a UV curable acrylic lacquer. Potentially the transparent layer 24 may comprise hard particles, such as corundum particles, i.e. particles of aluminumoxide.

The printed motif 21 may follow the unevenness or relief 26 of the substrate 28 and the transparent layer 24 applied over the printed motif 21 will conform to the relief of the printed motif 21, although it may be provided with local impressions or excavations 27B independently from the excavations 27A in the substrate surface 28, as well. Such local impressions or excavations 27B may be formed using methods of mechanical and/or chemical embossing, for example the methods discloses in WO 2010/070485.

After possible division and edge finishing of the obtained printed board, a decorative panel 1 in accordance with the invention is obtained. In this case, a floor panel 1 having mechanical coupling means 11, as illustrated in detail in the FIGS. 2 and 3.

Figure 6:
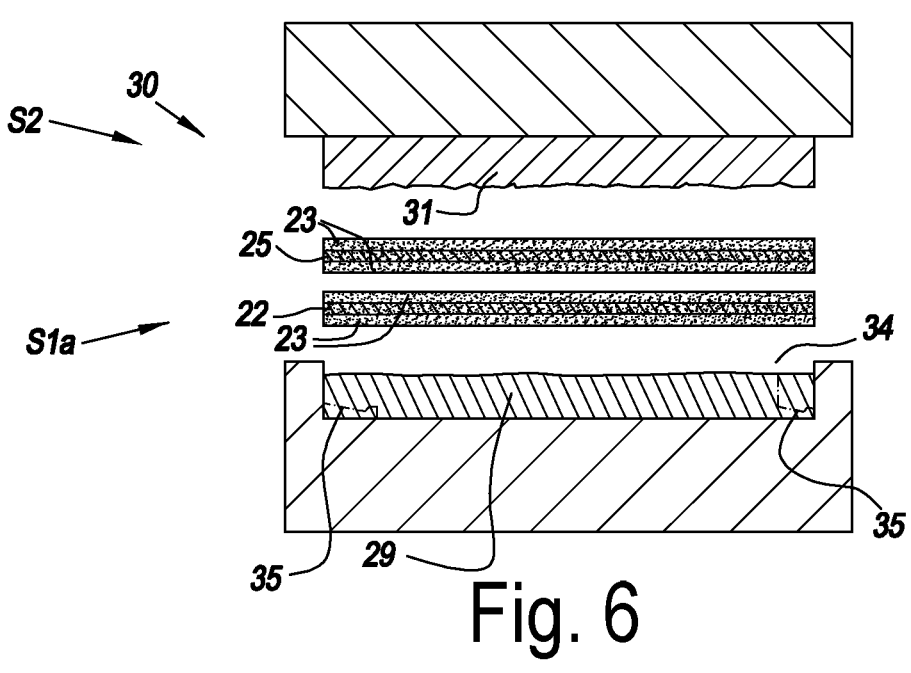
FIG. 6 represents an alternative for the are indicated with F6 in FIG. 5.

FIG. 6 shows an alternative to the method of FIG. 5, wherein the method of FIG. 6 differs in two main features, which must not necessarily be practiced in combination.

A first difference is that said step S2 of providing a decorative surface 8 comprises applying a paper sheet 22 to said substrate 6, wherein said paper sheet 22 is provided with melamine formaldehyde resin 23 and/or unsaturated polyester resin. In this case a printed paper sheet 22 and a transparent paper sheet 25 both provided with said resin 23 are introduced in the press 30. The resin provided paper sheets 22-25 are made to consolidate, cure and adhere to the substrate material 6 at the same time as the step S1 of shaping and curing of the substrate material or mixture 29. According to a not-represented alternative a further resin provided paper layer may be provided at the bottom side of the substrate material during the same press treatment, and/or a further resin provided paper layer, so-called underlay, in between said printed paper sheet 22 and said substrate material. It is clear that when applying the present alternative the steps S2a, S2b and S2c of FIG. 5 may be omitted.

A second optional difference is that the mould cavity 34 of the press 29 may be designed to shape and cure the substrate material such that profiled edges are formed at the substrate 6. In this case, as shown in dashed lines 35, the profiled edges may comprise a basic shape of mechanical coupling parts 11, to be further finished in subsequent operations to e.g. obtain coupling parts 11 similar to those shown in FIGS. 2, 3 and 5.

FIG. 7 shows another method for manufacturing a decorative panel 1 in accordance with the invention. The step S0 of mixing an unsaturated polyester resin with at least a vinyl monomer, and preferably filler materials is performed for example in a vessel 36. The mixture 29 is then transferred to an extruder 37 to shape and cure the material in a continuous sheet 38 form by extrusion through a flat die 39. The obtained sheet 38 is further shaped in two steps S1c-S1d. In a first further shaping step S1c the extruded sheet 38 is calandered, e.g. as illustrated here by means of rollers 40. In the rollers 40 a calibration of the desired thickness of the sheet 38 may be obtained. As an alternative the calibration of the thickness of the extruded sheet 38 may be at least performed by means of one or more plates positioned along the trajectory of the extruded sheet material as well. According to still another alternative the calibration of the thickness may at least be obtained by means of a belt press. During calibration a cooling of the sheet 38 may be performed by means of one or more of said rollers 40, plates, belts, as the case may be, being cooled. In a second further shaping step S1*d* the extruded sheet 38 may be formed to have a structured in one of its major surfaces. In this case a structured embossing roller 41 is used to from the extruded sheet 38. A further amount of substrate material may be provided upstream of the embossing roller 41, as shown here with the dashed line 42, wherein this material is cured and shaped by means of the embossing roller 41 such that a more pronounced structure or relief 26 can be obtained. The entire step S1 of curing and shaping takes places in a continuous operation in one and the same line with the extrusion, with the extruded sheet 38 material being in endless shape. According to a not represented alternative to providing said further amount of substrate material and shaping it with the embossing roller 41, an additional amount of material may be added in a non-uniform manner, for example by means of an additive manufacturing technique wherein the respective material is deposited in a spatially varying manner in order to create at least a part of said relief 26.

FIG. 7 illustrates that the method may further comprise the step S2 of providing a decorative surface 8 to said substrate 6. In the example a decorative surface 8 in accordance with the second possibility therefor is obtained. Firstly in the step S2*a*, one or more, preferably water-based, primer or background layers 32 are applied to said substrate 6, whereupon in step S2*b* a printed motif 21 is formed on the primed surface, as illustrated here by means of an inkjet printer 33, for example working with water based inks. In step S2*c* a transparent layer 24 is applied over said printed motif 21. Preferably such transparent layer 24 comprises a radiation curable lacquer, such as a UV curable acrylic lacquer.

In FIG. 7 a further digital printing operation S2*d* takes place and subsequent curing S2*c* takes place with the aim of forming excavations 27B in the applied transparent layer. The inkjet printer 33 prints a curing inhibiting substance 43 on the to be cured lacquer layer. After the curing step S2*f* a brushing operation is performed in step S2*e* wherein the non-cured lacquer and the curing inhibiting substance 43 is removed. In so doing excavations 27B forming a relief or structure are obtained at the location where the curing inhibiting substance 43 was printed. Such method of forming structure may be referred to as an example of chemical embossing. The relief or structure obtained in this manner is independent from the relief or structure 26 in the major surface 28 of the substrate 6. The depth and/or area of the maximum deformation available in the substrate surface 28 is larger than the depth, respectively area of the maximum independent deformation available in the surface of the transparent layer 24.

After possible division and edge finishing of the obtained printed and structured board, a decorative panel 1 in accordance with the invention may be obtained.

Figure 8:
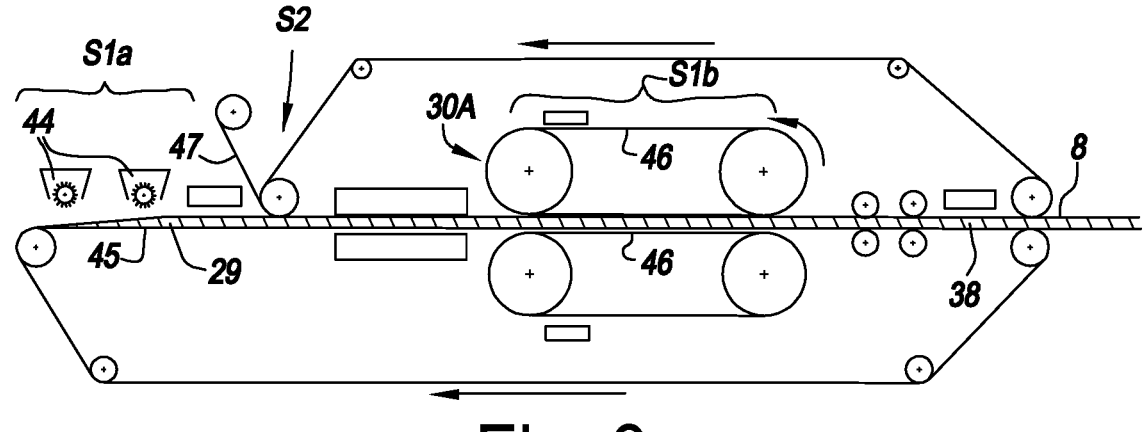

FIG. 8 illustrates another method for manufacturing decorative panels 1 in accordance with the invention. In this case one or more scattering operations 44 are performed by which the to be cured and shaped material is deposited on a conveying means 45, and then shaped and cured at least between the belts 46 of a double belt press 30A. The scattered material may be a prefabricated granulate formed from a mixture 29 of at least unsaturated polyester and vinyl monomer, and possibly filler materials and/or reinforcement fibers. According to a variant the scattered material may be a powder mix containing at least unsaturated polyester and vinyl monomer, and possibly filler materials and/or reinforcement fibers.

FIG. 8 further illustrates that a decorative surface 8 can be formed in accordance with the first possibility mentioned in the introduction by feeding at least a printed carrier 47 sheet along with the substrate material into the double belt press 30A.

With regard to the methods illustrated in FIGS. 5, 7 and 8, it is noted that the step of shaping and curing S1 is independent from the step S2 of providing the decorative surface 8. The step S2 as illustrated in FIGS. 5 and 7 e.g. can be replaced by the glued or glueless lamination of a printed carrier sheet 47 and/or a transparent layer 24 in accordance with the first possibility mentioned in the introduction, or the step S2 can be omitted as a whole in order to obtain an embodiment in accordance with the third possibility mentioned in the introduction. The step S2 as illustrated in FIG. 8 e.g. can be replaced by providing a printed motif 21 on the whether or not already cured and shaped substrate material, i.e. before or after the belt press 30A, in the same way as illustrated in connection to the step S2 in FIGS. 5 and/or 7. The method of FIG. 8 may also be applied to manufacture a decorative panel 1 with a motif 21 integrated in the substrate 6, for example using the so-called digital dry decoration method. In that case powders of differently colored substrate material are deposited in a controlled manner. One or more scattering units 44 can be applied, wherein these scattering units 44 comprise a plurality of individually controllable openings through which the powder can exit the scattering unit 44. The respective openings may be controlled to open and close in accordance with the motif to be formed in the respective portion of the thickness of the substrate 6, preferably at least at the surface 28 of said substrate 6. The step S2 as presently illustrated in FIG. 8 can then be omitted. Potentially the integrated motif may still be complemented by a printed motif 21 applied on top of the integrated motif, for example by means of inkjet printing.

Figure 9:
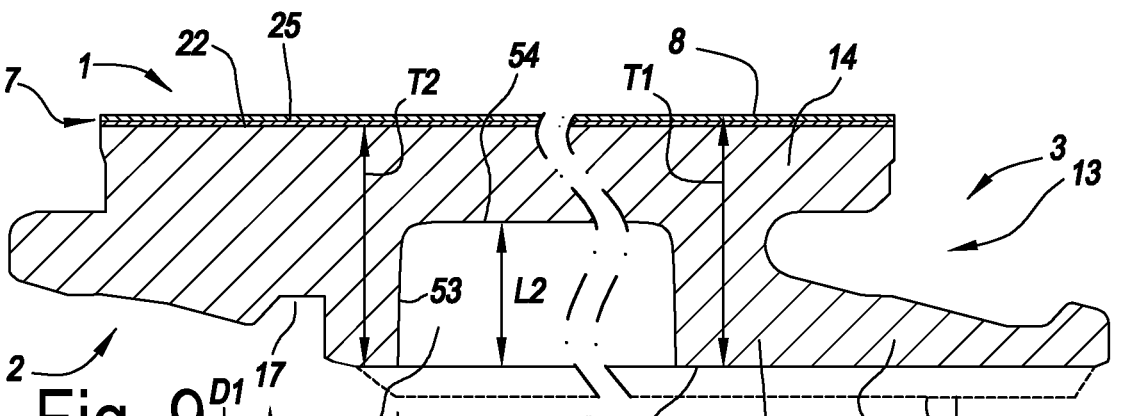
FIG. 9 at a larger scale gives a view on the area indicated with F9 in FIG. 5.

FIG. 9 shows that a decorative panel 1 in accordance with a preferred embodiment of the invention may comprise excavations 48 at the bottom surface 49 of the substrate 6. As illustrated here and in FIG. 10, said substrate 6 comprises a plurality of excavations 48 at a bottom surface 49 thereof. In dashed line 50 it is illustrated that such excavations 48 may be covered by means of a padding material, for example a foamed material such as IXPE, or another backing layer 10 applied at the bottom 9 of the decorative panel 1.

Figures 10, 11:
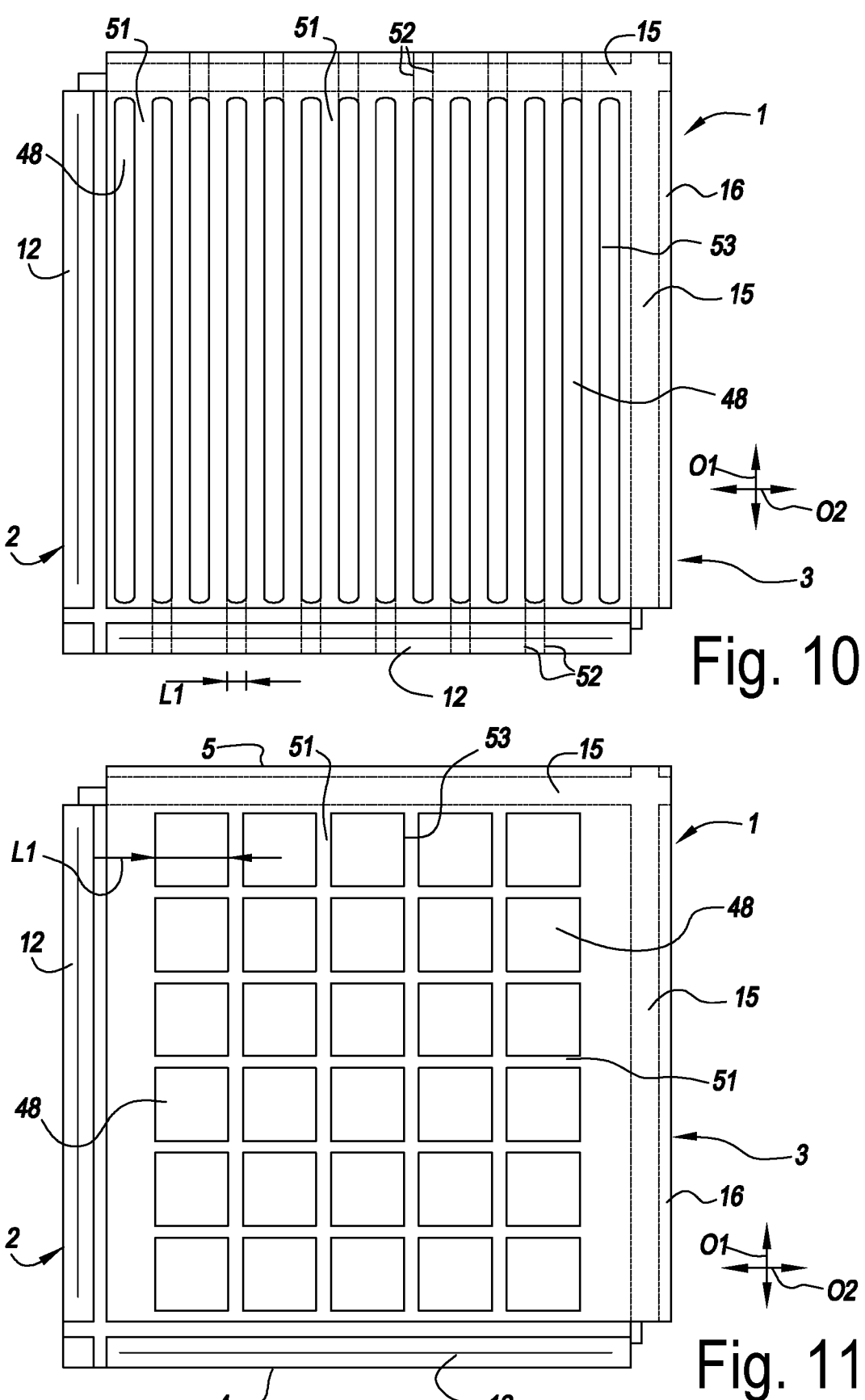
FIG. 10 represents a view in accordance with arrow F10 in FIG. 9.
FIG. 11 in a similar view shows an alternative.

As illustrated in FIG. 9 and in the variant of FIG. 10, said excavations 48 are formed as pockets that are only open towards the bottom surface 49 of the substrate 6, in accordance with the first possibility therefor mentioned in the introduction. The excavations 48 do not intersect the edges 2-3-4-5 of the decorative panel 1, such that the profiled edges containing the coupling means can be fully exploited. The plurality of excavations 48 is separated from each other by ribs 51, wherein said one or a plurality of excavations 48 together form an indented back surface extending over at least 40%, and in the present case over at least 60% of the entire back or bottom surface 49 of the substrate 6. The plurality of excavations 48 is a centrally or about centrally located formation of excavations 48. Said formation is uniform with fixed distances between the respective excavations 48 in one or both orthogonal directions O1-O2 in the plane of the bottom surface 49 of the substrate 6.

By means of the dashed lines 52 in FIG. 9 the second possibility for realizing excavations 48, as mentioned in the introduction, is illustrated. In case of the second possibility, said excavations 48 are formed as slits that are open towards the bottom surface 49 of the substrate 6 and towards at least one of the side edges 4-5 of the panel 1. In this case the slits are open each towards only one of the side edges 4-5 of the panel 1, though alternatingly towards either of the opposite side edges 4-5. The other two opposite edges 2-3 are uninterrupted by such slits.

The FIGS. 9 to 11 illustrate that the excavations 48 are defined as extending, besides in depth direction D1, also in two orthogonal main directions O1-O2, wherein the distance L1 between the opposite side walls 53 defining said excavation 48, in the orthogonal main direction O2 wherein the excavation 48 has the smallest extent, is larger than the thickness T1 of the panel 1, and even better amounts to at least 2 times the thickness T1 of said panel 1, including possible top layers 7 and backing layers 10. In the represented cases, the excavations 48 extend in depth direction D1 over a distance L2 of 30% of the thickness T2 of the substrate 6 or more.

Preferably the excavations 28 have a maximum depth, as expressed by the distance L2, of at least 20 percent of the thickness T1 of the panel 1. At their deepest point 54 the excavations 48 have a dome shaped geometry positioned on top of two opposite side walls 53 defining said excavation 48.

Excavations 48 like the ones illustrated in FIGS. 9 to 11, or similar, can be obtained during the step S1 of curing and shaping the substrate material, for example in the press 30 illustrated in FIGS. 5 and 6. Alternatively, the excavations 48 may be obtained by machining the bottom surface 49 of the substrate 6 subsequent to the curing and shaping step S1.

Figures 12, 13, 14, 15:
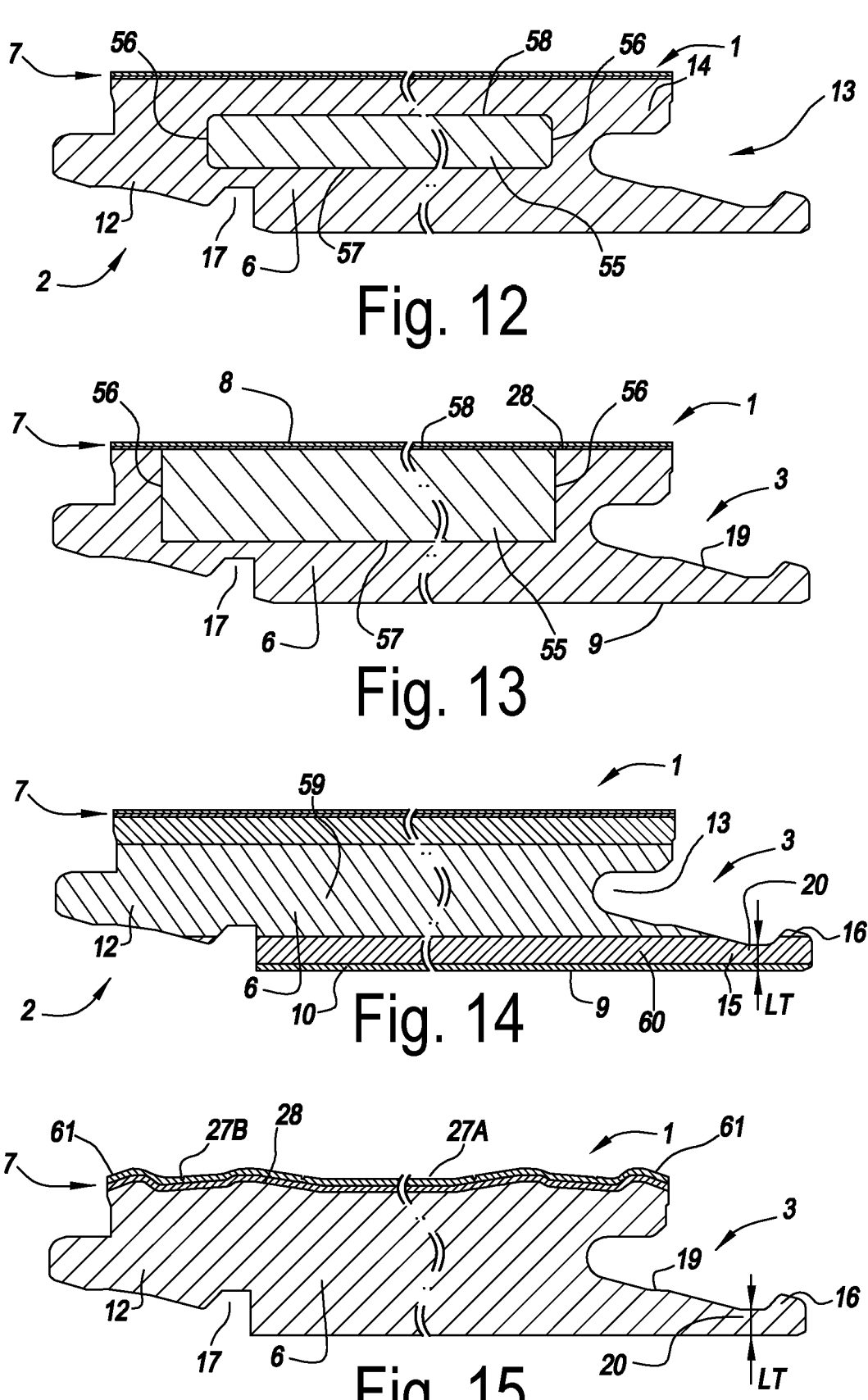
FIGS. 12 to 15 in a view similar to that of FIG. 9 shows alternatives.

FIGS. 12 and 13 illustrate an embodiment in accordance with the special embodiment mentioned in the introduction, wherein the substrate 6 of the decorative panel 1 contains an internal material 55 that is in at least two orthogonal directions adjacent to said copolymer or synthetic composite. The internal material 55 has a rectangular prism shape that is at least at both edges of a pair of two opposite small edges 56 adjacent to said copolymer or synthetic composite. Additionally the internal material 55 of FIG. 12 is completely surrounded by said copolymer or synthetic composite in that it is adjacent to said copolymer at both edges of the other pair of two opposite small edges, at its bottom surface 57 and at its top surface 58, as well.

In the example of FIG. 13, the internal material 55 is a board material available at the surface 28 of said substrate 6. In this case an MDF or HDF board (medium density or high density fiberboard) is applied as the internal material 55. The internal material 55 forms a major part of the actual surface 28 of the substrate 6, for example at least 80%.

FIG. 14 shows a possible geometry for a multilayered board, in this case a three layered board that may show one or more of the properties listed in the introduction for such multilayered boards. Preferably, as is the case here, the protruding portion of the tongue 12 is entirely formed form the central layer 59. The protrusion 16 of the lower lip 15 of the groove 13 is preferably, as is the case here, for at least 50% of its height formed from a bottom layer 60 of said substrate 6. At its thinnest portion 20, the lower lip 15 of the groove 13 is for at least 50%, and here even for at least 80%, of its thickness LT formed from said bottom layer 60 of said substrate 6.

FIG. 15 shows a decorative panel 1 having a substrate 6 with a structured major surface 28 and a structured top layer

7, wherein the structure or relief of the major surface 28 is independent from the structure provided in the top layer 7. The structure formed in the top layer 7 comprises excavations 27B the depth and area of which is smaller than the depth and area of the maximum deformation available in the substrate surface 28. In this case, the deformations of the substrate 6 may be used to imitate larger surface unevenness such as ripped out wood parts or wood cracks, and lower lying areas such as bevelled edges 61 and other lower edge regions, while the more restricted excavations of the top layer 7 imitate more subtle structure, in this case wood grain and wood pores.

The decorative panel of FIG. 15 may for example be obtained by means of the method illustrated in FIG. 7, wherein the structure or the excavations 27B of the top layer 7 are obtained using a method of chemical embossing.

Figure 16:
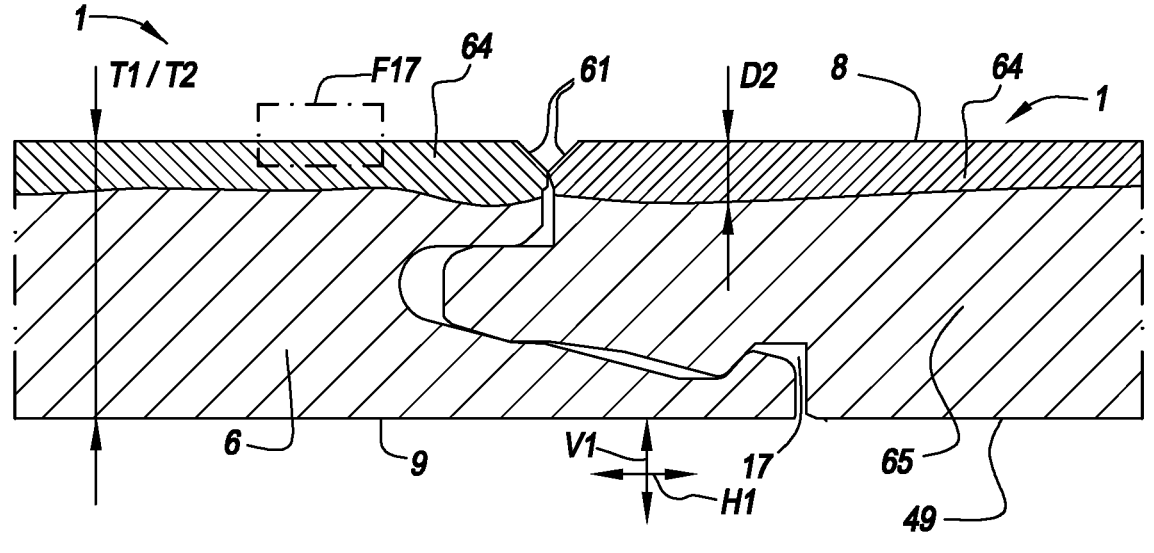
FIG. 16 in a view similar to that of FIG. 3 shows a variant.

FIG. 16 shows a decorative panel 1 having a decorative surface 8 in accordance with the third possibility therefor, as described in the introduction. As shown on FIG. 17 the surface 28 of the substrate 6 is visible at the surface of the panel 1 and comprises at least two differently colored regions 62-63 forming a motif. The coloration extends towards the center of the substrate 6 over a depth D2 of at least 0.5 mm.

Figure 17:
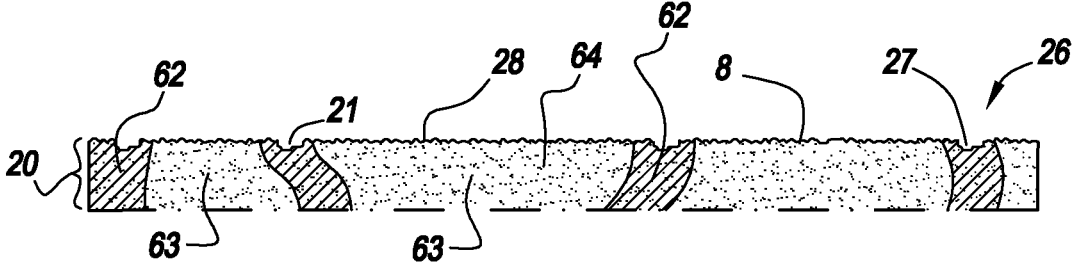
FIG. 17 at a larger scale represents a view on the area F17 of FIG. 16.

The decorative panel 1 illustrated in FIGS. 16 and 17 is actually a multilayered board in which at least one layer 64 is provided with a color different from the color of another layer 65 within the multilayered substrate 6. The layer 64 is colored using coloring pigments and comprises an integrated motif. Namely, as mentioned above, the layer 64 comprises regions 62-63 of different colors forming a motif.

The decorative panel 1 illustrated in FIGS. 16 and 17 can be obtained by means of the so-called digital dry decoration method.

Figure 18:
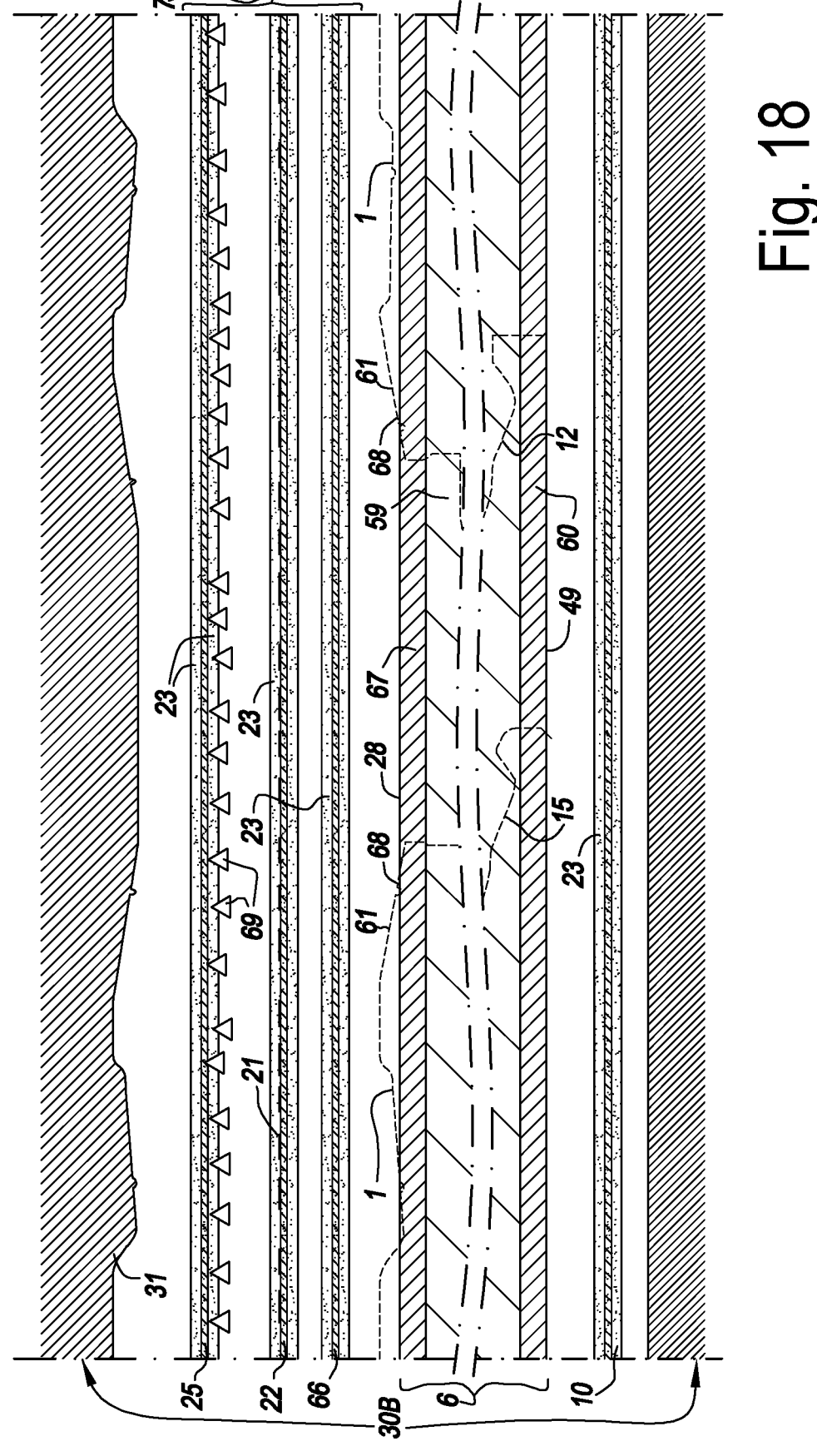
FIG. 18 illustrates an alternative method for manufacturing a panel in accordance with the invention.

FIG. 18 illustrates an alternative method for manufacturing a decorative panel 1 in accordance with the invention. Herein a substrate 6 that has been cured and shaped in a not-represented step S1, for example by an extrusion operation through a flat die and subsequent thickness calibration, similar as that illustrated in FIG. 7, is provided. Using a heated press 30B resin impregnated paper layers, including a printed paper sheet 22 are consolidated, cured and adhered to the substrate 6. As illustrated here, the resin impregnated paper layers may further comprise a transparent paper sheet 25, an underlay 66 and a backing layer 10. The substrate 6 illustrated here is a three layered substrate, in which the outer layers 60-67 comprise a thermosetting resin different from the unsaturated resin present in the central layer 59. In this way an enhanced delamination resistance may be obtained with the resin 23 contained in the paper layers 22-25-66-10, which preferably comprises melamine formaldehyde, ureumformaldehyde and/or phenolformaldehyde. In dashed line 68, it is illustrated that the substrate 6 and panel 1 obtains a structure during pressing. For this purpose, the surface 28 of the substrate 6 may have been pre-formed prior to the pressing operation at least partially in accordance with the structure to be obtained. In the represented example, however, the provided substrate 6 has a substantially flat major surface 28, and the illustrated pressing operation may deform the substrate material 6 to arrive at the structure illustrated with the dashed line 68.

FIG. 18 further illustrate that the decorative panel 1 may comprise hard particles 69 at a position above the printed motif 21. In this case the hard particles 69 have at least been provided in the resin 23 available below the transparent paper sheet 25.

It is noted that the decorative panels of FIGS. 15, 16 and 18 in dashed line 68 at at least two opposite edges 2-3 are provided with lower edge regions, in these cases in the form of bevelled edges 61. In the case of FIG. 15 the decorative surface 8 of the decorative panels 1 continues from the global surface of the panels 1 without interruption onto and over the surface of the bevelled edges 61. A similar result would be reached in the case of the panels 1 having the substrate 6 shown in dashed line 68 in FIG. 18. In the case of FIG. 16 the lowered edge region has been obtained by machining away a portion of the top edge of the panel 1, in this case to create a bevelled surface. The bevelled surface is limited to the colored layer 64 and has the same color or color variations as the global surface 28 of the substrate 6.

It is clear that a bevelled edge 61 or a lowered edge region with a different geometry may be formed at one or both edges of one or both pairs of opposite edges. Such bevelled surface may be provided with a decoration with is separate from the decoration of the global decorative surface, may be covered by a same or similar decorative surface as the global surface of the decorative panel 1, for example in that the decoration of the global decorative surface continues uninterruptedly over the lowered edge region. Instead of bevelled shaped, the lowered edge region may be formed to have a substantially flat and/or horizontal bottom area, for example in order to imitate a grouted joint.

The present invention is in no way limited to the above described embodiments, but such decorative panels and methods may be realized according to several variants without leaving the scope of the invention.

The invention claimed is:

1. A decorative panel comprising a substrate and a decorative surface, wherein said substrate comprises a substrate material with a copolymer of an unsaturated polyester;
   wherein the substrate comprises at least first and second layers comprising the copolymer;
   wherein the first layer is provided with a first color different from a second color of the second layer;
   wherein the first layer includes an integrated motif made up of a coloration including colored regions;
   wherein the integrated motif is present at least at a surface of the substrate, and extends at least 0.5 mm into a thickness of the substrate;
   wherein said surface is visible at said decorative surface for at least 30% of an area of said decorative surface;
   wherein said integrated motif is locally complemented by means of a printed motif.

2. The decorative panel of claim 1, wherein said copolymer is a copolymer of an unsaturated polyester and a vinyl monomer.

3. The decorative panel of claim 2, wherein said copolymer is a copolymer of an unsaturated polyester and styrene.

4. The decorative panel of claim 1, wherein said unsaturated polyester is a dicyclopentadiene resin or is selected from the group consisting of a resin containing primarily terephthalic acid, a resin containing primarily phthalic anhydride, and a resin containing primarily isophthalic acid.

5. The decorative panel of claim 1, wherein said substrate further comprises at least 3 weight parts filler materials per part of the copolymer.

6. The decorative panel of claim 1, wherein said substrate further comprises at least 5 wt %, reinforcement fibers.

7. The decorative panel of claim 1, wherein said substrate further comprises 0.1 to 10 wt % of a metal salt, and/or 0.1 to 10 wt % of an organic peroxide.

8. The decorative panel of claim 1, wherein said panel is provided with a lowered edge region obtained by machining away a portion of a top edge of the panel to create a beveled surface, wherein the beveled surface is limited to the first layer and has the same color variations as the surface of the substrate.

9. A method for manufacturing a decorative panel, wherein said decorative panel comprises a substrate and a decorative surface,
   wherein said method comprises at least a step of providing a substrate with a substrate material comprising a copolymer of an unsaturated polyester;
   wherein said method further comprises the step of providing a decorative surface to said substrate;
   wherein the substrate comprises at least first and second layers comprising the copolymer;
   wherein the first layer is provided with a first color different from a second color of the second layer;
   wherein the first layer includes an integrated motif made up of a coloration including colored regions;
   wherein the integrated motif is present at least at a surface of the substrate, and extends at least 0.5 mm into a thickness of the substrate;
   wherein a printed motif is formed on the surface of said substrate;
   wherein said surface remains visible at said decorative surface for at least 30% of an area of said decorative surface;
   wherein said integrated motif is locally complemented by means of said printed motif.

10. The method of claim 9, wherein said step of providing a substrate comprises:
   providing a mixture by mixing a resin selected from the group consisting of a dicyclopentadiene resin, a resin containing primarily terephthalic acid, a resin containing primarily phthalic anhydride, and a resin containing primarily isophthalic acid with at least a vinyl monomer; and
   shaping and curing said mixture into at least a part of said substrate.

11. The method of claim 10, wherein said mixture further comprises filler materials, reinforcement fibers, metal salt and/or organic peroxide.

12. The method of claim 10, wherein said shaping and curing said mixture comprises pressing said mixture at a pressure of 1 MPa or above.

13. The method of claim 10, wherein said shaping and curing comprises forming said part of said substrate to have a board shape with a decorative relief in at least one of the major surfaces of said board.

* * * * *